Dec. 1, 1936.  F. L. O. WADSWORTH  2,062,622
FEEDER FOR THERMOPLASTIC MATERIAL
Original Filed July 11, 1933   2 Sheets-Sheet 1
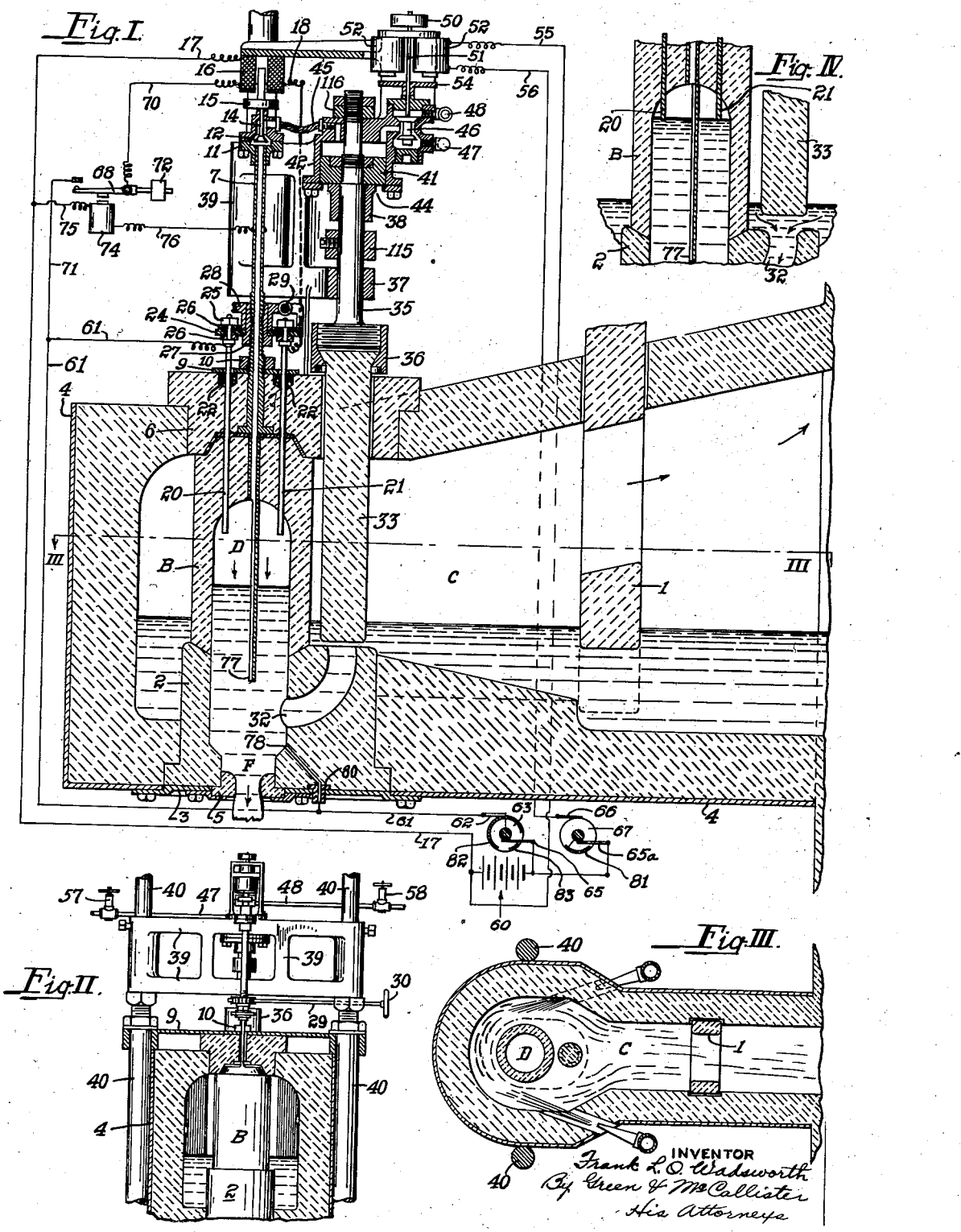

Dec. 1, 1936.  F. L. O. WADSWORTH  2,062,622
FEEDER FOR THERMOPLASTIC MATERIAL
Original Filed July 11, 1933  2 Sheets-Sheet 2
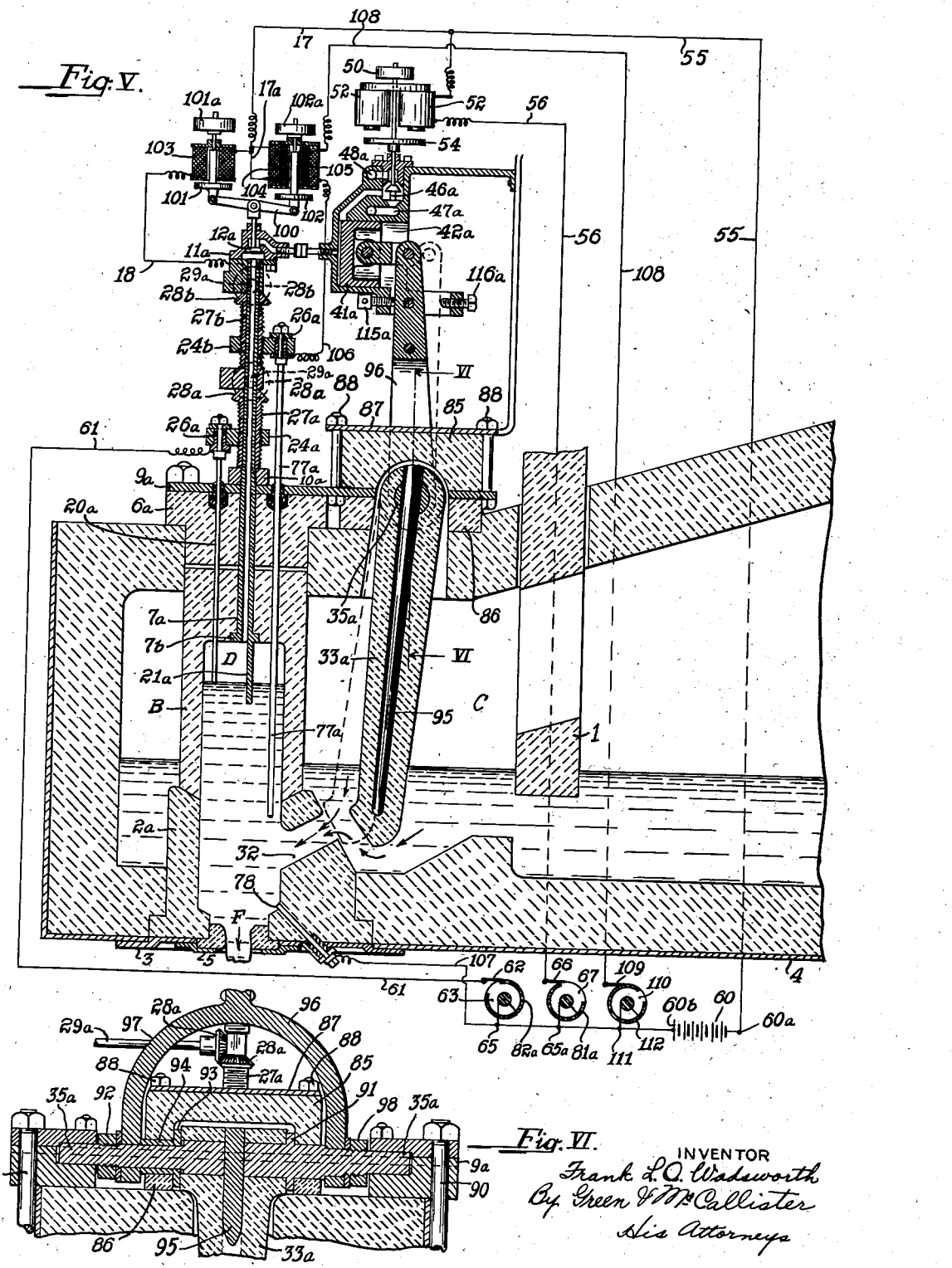

Patented Dec. 1, 1936

2,062,622

UNITED STATES PATENT OFFICE 2,062,622

FEEDER FOR THERMOPLASTIC MATERIAL

Frank L. O. Wadsworth, Pittsburgh, Pa., assignor to Ball Brothers Company, Muncie, Ind., a corporation of Indiana Application July 11, 1933, Serial No. 679,889
Renewed February 28, 1936

15 Claims. (Cl. 49—55)

My invention relates to the art of feeding molten glass, or other similar thermoplastic substances, from a large body of suitably conditioned material to a series of receptacles; and is particularly directed to the provision of means for effecting an automatic self control of the successive quotas, or charges, of glass which are successively segregated or drawn from the main body of molten material and then delivered to the receiving receptacles, under the joint action of gravity and of other imposed and periodically varied forces, such, for example, as may be conveniently obtained by subjecting the successively segregated quotas of material to an alternate decrease and increase in surface pressure, to thereby progressively vary its flow from the parent body to the discharge outlet.

More specifically defined my present improvements relate to a new type, or species, of forced-flow-fluid impulse feeders, in which successive masses or volumes of glass are first drawn from a large pool of molten material into a "bell" or segregation chamber by the establishment of a sub-atmospheric pressure thereon, and are then discharged therefrom under the combined effect of gravity and of a super-atmospheric pressure applied to the free surface of the segregated mass; and one of the principal objects of my invention is to regulate the flow of glass, to and from the segregation chamber, by the interrelation of these sub-atmospheric and super-atmospheric pressures with the head or height of glass above the delivery outlet, and thereby maintain a uniformity of operative conditions, and secure an automatic self control of the rate of discharge or "feed" of the material during the successive steps or stages in each cycle of delivery action.

Another correlative object of these improvements is to automatically shut off the connection between the air space in the segregation chamber and the vacuum and pressure lines leading thereto when the glass therein has reached certain predetermined levels, and thereby control both the inflow and the outflow of the molten material to and from the said chamber, independently of any variations in the said pressures or in the temperature and viscosity of the glass itself.

A further purpose of the present invention is to provide manually adjustable means for readily varying and regulating the rate of delivery of the glass to the receiving receptacles, and the quantity of glass so delivered to each; and thereby controlling both the shape and weight of the successively formed charges of molten material in accordance with the form and volumetric capacity of the said receptacle.

Another important object of this invention is to automatically vary the ratio between the area of the inlet, or supply, and the outlet, or delivery, orifices of the segregation chamber during the successive steps of each feed cycle; and thereby secure a more rapid and better controlled action of both the sub-atmospheric (vacuum), and the super-atmospheric pressures, in first segregating, or accumulating, and then discharging each successively delivered charge or quota of glass.

Other features of my present improvements will be made apparent, to those skilled in this art, by the hereinafter described embodiments of my invention, which are to be considered only as exemplary of the various ways in which the characteristic objects and purposes of the invention may be attained, and are not to be regarded as limiting the scope of my claims therefor.

In the accompanying drawings which illustrate certain selected types of construction that are adapted to practice my improved method of glass feeding, Fig. I is a longitudinal central section—partly in elevation—of one form of my "self controlled" feeder apparatus; Fig. II is a front view—partly in section—of this structure; Fig. III is a horizontal section, on the plane III—III of Fig. I, of the same apparatus; Fig. IV is a partial vertical section—on the plane of Fig. I—showing certain parts of that structure in another position (at another stage in the cycle of feed action); Fig. V is a longitudinal vertical section, (similar to that of Fig. I), of a second illustrative embodiment of my invention; and Fig. VI is a transverse sectional elevation on the plane VI—VI of Fig. V.

Referring first to the construction shown in Figs. I to IV inclusive; C indicates a forehearth or "dog house" chamber that extends out from the front of a glass tank furnace of the usual construction, and is provided with a vertically movable gate I whose lower edge is normally immersed to a slight depth in the body of molten glass in the communicating tank and forehearth chambers—so as to serve as a "skimmer" for the forwardly moving molten material—but which may, when desired, be lowered to such a point, (see dotted line position of Fig. I), as to cut off all flow of glass to the outer end of the forehearth. In advance of this gate the floor of the chamber C is provided with a removable "flow block", 2, which may be inserted (or removed) from below, and which is held in position by a plate 3, that is bolted to the bottom face of the forehearth frame or "boot" 4. The flow block 2 is apertured to form the lower end of a cylindrical segregation chamber D, and is provided with a removable ring bushing 5, whose area and cross sectional form determines the size and shape of the discharge or delivery orifice F, from which the glass escapes from the chamber D. The upper portion of this chamber is formed by a stationary bell B, whose lower end is engaged by a coned recess in the upper face of the block 2 and whose upper end is correspondingly engaged by a frusto conical recess in the roof block 6. The block 6 is perforated to receive a tubular bolt member 7, which is rigidly clamped thereto by the plate washer and nut elements 9—10, and which is provided with a downward extension that passes through the adjacent closed end of the bell member B, and into the upper portion of the segregation chamber D. The upper extremity of the tube 7 carries a valve box 11, in which is mounted a downwardly opening poppet valve 12 that serves to control communication between the chamber D and the vacuum and pressure supply system of the apparatus. The valve 12 is attached to a stem 14, which carries a weighted armature 15, and is closed by the lifting action of a single coil electromagnet 16, that is supplied with current through the leads 17 and 18.

The roof block, and washer members 6 and 9 are also apertured to receive two vertically disposed contact rods 20—21, of nichrome (or other difficultly fusible metal of relatively low electrical resistance), which project downwardly, through the closed cap of the bell B, into the segregation chamber D. These rods are of such size as to slide easily in the openings through the roof and bell blocks 6 and B, but are each provided with a packing ring of mineral wool, or other suitable material, which is confined in the pockets 22—22 on the upper side of the roof block 6 by the cover plate or washer 9, and which serves to not only prevent any leakage of air through the rod receiving apertures but to also insulate the rods from the metal cover member 9. The upper shouldered ends of the rods 20—21 are rigidly clamped to a circular collar 24 by the nuts 25, and are insulated therefrom by suitable washer elements 26 of moulded mica or like material; and the collar 24 is centrally bored to engage a cylindrical sleeve nut 27 that is threaded on the tubular bolt 7 and is provided with a toothed head 28 by which it can be rotated in its collar bearing, to move the connected elements 20—21—24 up or down on the pipe support 7. The toothed head 28 may be conveniently revolved by means of a worm and worm shaft element 29 whose inner end is rotatably supported in a bracket extension on the collar 24, and whose outer end carries a manually operable hand wheel 30 (see Fig. II).

The flow block 2 is eccentrically disposed with respect to the cooperating bell member B, and its inner or rear portion is provided with a curved passageway 32 that leads from the cylindrical segregation chamber in the block to its upper submerged face in the forehearth chamber C. The outer, or forehearth, end of this passageway is controlled by a vertically movable plug valve 33 which passes upward through an opening in the roof block 6, and is rigidly secured to the adjacent extremity of a reciprocable shaft member 35 by the tapered clamp ring 36. The shaft 35 is slidably mounted in bearing blocks 37 and 38 on the cross frame 39, which is, in turn, carried by the cylindrical posts 40—40, that form a part of the supporting "boot" for the forehearth assembly; and the upper portion of this shaft is provided with a piston head 41, which works in a cylinder 42 that is also carried by the frame 39. The lower end of this cylinder is open to the atmosphere—through the ports 44 in the head block 38—and the space above the piston 41 is connected, on one side, to the interior of the valve box 11 by the flexible tube 45, and on the other side, to the chamber between the ends of a double disc poppet valve 46, that serves to control communication between the cylinder and the pipe connections 47 and 48. The valve 46 is normally held in the position shown in Fig. I—to establish communication between the pipe 47 and the upper end of the cylinder 42—by a weight 50 on the valve stem 51; but it may be lifted, (to close the connection with the pipe 47 and concurrently open the connection with the pipe 48), by means of a pair of electromagnets 52—52, which are adapted to act on a soft iron armature 54 that is attached to the stem 51, and which are supplied with current from the leads 55—56.

The pipe 47 is connected to a tank or reservoir (not shown) in which a constant super-atmospheric pressure is maintained by any suitable means; and the pipe 48 is connected to another tank in which a constant sub-atmospheric (vacuum) pressure is similarly maintained;—each of these connections being provided with manually operable needle valves 57 and 58 for the adjustment and regulation of the pressures, and rates of flow, of the fluid to and through the flexible conduit 45 and the bell pipe connection 7.

The lead 17 of the coil 16 is directly connected to one terminal of any suitable source of electric current (e. g. the battery 60); and the other lead 18 is directly connected to the contact rod 21 of the bell assembly. The associated contact element 20 of this assembly is connected, by the wire 61, with an adjustable brush 62, that bears on a constantly revolving commutator drum 63, the shaft of which is electrically coupled to the other terminal of the current source by the brush contact 65. The lead 55 of the coils 52 is also directly connected to one terminal of the current source (e. g. the battery 60); and the other lead, 56, of these coils is connected to an adjustable brush 66 that engages with the "make and break" commutator 67, whose shaft is, in turn, connected to the other terminal of the current source by the contact 65a. The commutators 63 and 67 are revolved in synchronism by any suitable variable speed motor (not shown), and, for the sake of clearness, are here illustrated as carried by separate shafts; but it is obvious that they may be mounted side by side on a common shaft, in which case only one shaft contact (65 or 65a) is necessary to complete the circuit to the battery 60.

The terminal lead 18 of the coil 16 is also connected to the pivot bearing of an electric switch 68, by the wire 70; and the contact block of this switch is, in turn, coupled to the lead 61, and the rod 20, by the wire 71. The switch 68 is moved in one direction (to close the circuit 70—71) by the weight 72, and in the other direction (to open the circuit) by an electromagnet 74. One terminal of this magnet coil is coupled to the battery lead 17 by the wire 75, and the other terminal is electrically connected to the tubular bolt 7 by the wire 76. As shown in Fig. I, one side, or segment of this bolt is extended down into the segregation chamber and terminates at a point 77, which is adjacent the inner end of the passageway 32. The flow block 2 is provided at one side with a metal terminal 78, which is mounted in an insulating bushing 80 and is connected directly to the wire 61.

The operation of the parts thus far described is as follows: When the various movable elements of the feeder are in the position shown in Figs. I and II, compressed air is flowing from the pipe 47 into the upper end of the cylinder 42 and through the connections 45 and 7 into the upper end of the bell chamber D, and is exerting a pressure on the segregated mass of glass therein to aid in its extrusion from the delivery orifice F. During this period of extrusion action the plunger valve 33 is held in its depressed position by its own weight and by the super-atmospheric pressure on the top of the piston 41, thus preventing, or restricting, the back flow of glass from the segregation chamber D to the forehearth chamber C, and permitting the compressed air to exercise its full effect on the expulsion of the molten material from the delivery orifice. This accelerated discharge of the molten material will continue until the level of the glass in the segregation chamber has been depressed to the point 77. When this occurs the electrical circuit through the glass, between the terminals 77 and 78, and through the coil 74, is broken and the switch 68 is closed by the action of the weight 72. This action closes the circuit through the coil 16 and lifts the valve 12, thus cutting off communication between the pressure conduit 47 and the pipe 7, and preventing any further flow of compressed fluid into the bell chamber. The glass will however continue to flow from the orifice F under the action of gravity and of the expansion of the air already in the bell; and the commutator and brush elements 66—67 are so adjusted that immediately after the closure of the valve 12 the brush 66 will be engaged by the shaft contact segment 81 and the circuit closed through the coils 52. This lifts the valve 46 and estableshes communication between the suction (vacuum) line 48 and the upper end of the cylinder 42, thereby lifting the plunger valve 33 and admitting a fresh supply of glass to the segregation chamber D. The molten material will now flow by gravity directly from the forehearth chamber C to and through the delivery orifice F, until the rotation of the commutator 63 carries the following end of the shaft contact segment 82 out of engagement with the brush 62. This movement breaks the circuit, 17—70—68—71—61, through the coil 16, and permits the valve 12 to be opened by the weight 15, thereby establishing communication between the vacuum conduit 48 and the bell connection 7. The vacuum, or partial vacuum, thus created in the upper end of the chamber D greatly accelerates the flow of glass through the wide open passageway 32, and very quickly fills this chamber to a height determined by the setting of the contact points 20—21. The initial upward movement of the molten material again closes the circuit through the terminals 77—78 and the coil 74,—thus retaining the switch 68 in its open position when the brush 62 engages the commutator segment 83—and as soon as the glass comes in contact with the terminals 20—21, the circuit, 17—18—21—20—61—62—83—65, through the coil 16, is closed and the valve 12 is again lifted; thus cutting off communication with the vacuum system, and immediately arresting further flow of the molten material into the bell by the compression of the air now trapped in the upper part thereof.

The angular length of the conducting segment 81, on the rotating commutator 67, is so adjusted that at, or about, the time of this second closure of the valve 12, the circuit through the coils 52 is broken thus readmitting air under pressure to the upper end of the cylinder 42, (by the downward movement of the valve 46), and depressing the plunger member 33 to close or restrict the upper end of the passageway 32. But the valve 12 will still remain closed until the continued rotation of the commutator 63 carries the conducting segment 83 out of engagement with the brush 62 and thus breaks the circuit through the coil 16. This valve (12) will then be reopened by the weight of the armature 15 (aided by the air pressure on its upper end) and super-atmospheric pressure will be again applied to the surface of the glass in the chamber D to assist gravity in discharging the molten material from the delivery orifice F—the gap following the segment 83 being of sufficient length to permit the glass to be depressed below the level of the contact terminals 20—21 before the segment 82 is again engaged by the brush 62.

It will now be understood that the above described mode of operation is particularly advantageous and effective; first in securing the most efficient and rapid action in refilling or recharging the segregation chamber by the vacuum (suction) action of the sub-atmospheric pressure on the glass in the bell B, without exerting a great retractive effect on the material flowing from the delivery orifice F under the action of gravity—because at the time of such recharging the passageway 32 is not throttled or restricted by the plunger valve 33, and the area of this passageway is preferably greater than the area of the outflow opening F—second in permitting the use of a relatively high vacuum without substantially increasing the retardation of the outflow from the said orifice (F) and without incurring any danger of pulling the glass up into the air pipe 7 and choking the latter with congealed metal—because the automatic closure of the valve 12 will prevent such an occurrence—third in thus securing a refilling of the segregation chamber (to a definite predetermined level) in a minimum length of time; fourth in effecting a rapid discharge of the glass under the application of a relatively small super-atmospheric pressure—because during such application the supply passage 32 is substantially closed by the plunger valve 33, and the full effect of the air pressure is available for accelerating the flow from the constantly open delivery orifice F, and is not, in part, wasted in producing a back flow into the forehearth chamber; fifth in definitely cutting off the application of super-atmospheric pressure to the glass before the level of the latter has been forced below the end of the supply passage 32— thus eliminating any danger of blowing air back into the parent pool of molten material—sixth in obtaining and maintaining a self controlled and self constrained regulating of the inflow and outflow of glass, to and from, the segregation chamber, independently of the exact setting and uniform action of the timing mechanism which opens and closes the air valve 46, and independently of the fluidity or viscosity of the molten material which flows from the forehearth chamber to the segregation chamber; and seventh in permitting an easy manual adjustment of the various parts which influence or regulate; (1), the inflow of a definite quantity of glass to the delivery chamber D—(i. e. the support for the contact terminals 20—21)—(2), the rate of inflow, and of discharge (i. e., the valves 58 and 57); (3), the relative times of application of the sub-atmospheric, and super-atmospheric pressures to the glass in the bell B (i. e., the adjustable brushes 62 and 66); and (4) the speed of operation as a whole—viz., the length of each complete cycle of feed action—(i. e. the variable speed drive for the commutators 63—67).

Figs. V and VI illustrate a second exemplary embodiment of my invention. In the construction therein shown the general form and arrangement of the parts C—1—2a—3—4—5—B—6a—7a—11a and 12a, are substantially the same as in the first described exemplification of my improvements, and do not therefore require any additional description. The tubular bolt 7a of the combination now under consideration is provided with an enlarged collar 7b, which engages the upper end of the bell B, and cooperates with the nut 10a in locking the bell and roof block members in assembled relation on the plate 9a; and this plate is extended laterally and rearwardly to form the bearing supports for the ends of a transverse shaft 35a which carries a rocking gate valve 33a, that controls the forehearth end of the supply passageway 32. The upper end of this valve member extends through an opening in the roof of the chamber C, and is surrounded and enclosed by the two fire clay or graphite blocks 85—86, that are positioned above and below the plate 9a, and are clamped down against the top of the forehearth (by the plate and bolt elements 87—88—88 etc., and 9a—90—90 etc.), so as to prevent any escape of the hot gases of combustion through this opening. The enclosed head of the valve 33a is rigidly secured to the shaft 35a by means of the collar, nut and washer elements 91—92—93—94 etc., and by the metal rod 95, which passes through the said shaft and extends downward into the depending arm of the valve to a point adjacent its lower end.

The shaft 35a is rocked on its trunnion bearings in the plate 9a by means of a pair of arms 96—97, which are bolted together at their upper ends, and are flared outwardly at their lower extremities to engage shouldered portions of the shaft; one of the said arms (96) being secured thereto by a key and by the nut 98, and the other (97) being correspondingly held in position between the nut 92 and the washers 93—94. The upper connected ends of these arms are pivotally linked to the piston 41a, in the open ended cylinder 42a; and the space behind this piston is connected to the central portion of a valve chamber which contains a double acting poppet valve 46a, that serves to control communication between the cylinder and the pressure and vacuum lines 47a and 48a. The valve 46a is actuated by a weighted armature (50—54) and an electromagnet (52—52), whose coils are connected to the two terminals 60a and 60b of a battery, 60, (or other suitable source of electric current) by the leads 55—56 and the adjustable brush and commutator elements 66—67 and 65a; the construction and arrangement of all of these parts being identical with that of the correspondingly numbered elements of Figs. I and II.

The stem of the single acting disc valve 12a is pivotally connected to the central portion of an actuating lever 100; and the opposite ends of this lever are flexibly coupled to two weighted armature cores 101 and 102, one of which is motivated by a single coil electromagnet 103, and the other of which is under the control of a compound-two coil electromagnet 104—105. One end of the single coil is connected, by the line 17, to the terminal lead 55, and the other end is electrically coupled, by the wire 18, to the upper end of the air pipe elements 7—11a. The lower end of the pipe 7a is provided with a downwardly extended segmental portion 21a which is adapted to make contact with the glass before the latter rises to the desired predetermined height in the bell chamber; and the portion of the pipe that extends above the roof block 6a is provided with two rotatable threaded sleeves 27a and 27b, each of which may be independently revolved by a pair of mitre gears, (e. g. 28a—28a) and a laterally extending shaft (e. g. 29a). Each of these threaded sleeves is engaged by a nut (24a and 24b) which serves to support a nichrome contact rod (20a and 77a) that is insulated therefrom by moulded mica washers (26a—26a etc.) and is extended downward through the roof block and bell members (6a—B) and into the segregation chamber D. Either or both of these rods may be raised or lowered, (by revolving the corresponding sleeve nut 27a or 27b), so as to position the lower ends thereof at the points or levels of maximum rise or fall of the glass in the segregation chamber.

The head of the contact rod 20a is electrically connected to the adjustable brush 62 of the revolving commutator 63 (by the line 61), and the shaft brush 65 of the commutator is coupled to the battery terminal 60b. The upper end of the contact rod 77a is connected to one terminal of the magnet coil 104 (by the wire 106), and the other terminal of this same coil is coupled to the battery pole 60a by the leads 17 and 55. The floor block 2a is provided with an insulated contact rod 78, which is adapted to cooperate with the terminal 77a (in controlling the action of the valve 12a), and which is directly connected to the opposite battery pole 60b; so that as long as the glass is above the lower end of the rod 77a the current through the outer coil 104, of the compound electromagnet 104—105, remains closed. The inner coil 105 of this electromagnet is also connected, at one end to the battery terminal 60a by the leads 55—17 and 17a, and at the other end to the independent lead 108, that runs to an adjustable brush 109 on a third commutator 110, whose shaft contact 111 is coupled to the opposite battery terminal 60b. The inner and outer coils 104 and 105 are oppositely wound and so proportioned that as long as current is flowing through both, there is no substantial magnetic pull on the armature 102, and the latter is held in its lowermost position (as shown in Fig. V) by the weight 102a.

The action of this last described electromagnet control system in actuating the two air valves 12a and 46a in the desired synchronism—to automatically regulate the flow of glass into and out of the segregation chamber D—will now be readily understood. When the commutator circuit 66—65a is open—i. e., when the brush 66 is out of contact with the conducting shaft segment 81a—the valve 46a is held down by the weight 50, thus opening communication between the inner end of the cylinder 42a and the exhaust (vacuum line 48a; and the gate valve 33a is held away from the forehearth end of the supply passage 32, thus permitting a free unrestricted flow of glass to the bell chamber D. During the major portion of this stage of action the commutator circuit 109—111 is closed, by the engagement of the adjustable brush 109 with the conducting shaft segment 112,—(thus establishing a current flow through both the inner and the outer coils of the compound electromagnet 104—105)—and the commutator circuit 62—65 is also closed (by the engagement of the brush 62 with the shaft conducting segment 82a), but the circuit through the coil 103 is broken at the contact 20a; thus permitting both of the floating armatures 101 and 102 to be depressed by the weights 101a and 102a, and the valve 12a to be correspondingly held open, thus establishing communication between the interior of the bell B and the vacuum conduit 48a. But as soon as a sufficient quantity of glass has been drawn into the segregation chamber to raise the level therein to the lower end of the contact rod 20a, the circuit through the coil 103 will also be closed, and the armature 101 will be lifted; thus closing the valve 12a and arresting any further rise of the molten material in the bell by the compression of the air trapped therein, although the glass may still continue to flow freely through the passageway 32 and out of the delivery orifice F under the unassisted action of gravity. But the commutator brush 66 is preferably so adjusted that immediately after this closure of the valve 12a (at the end of the suction inflow) the commutator circuit 66—81a—65a is closed, and the flow of current through the coils 52 then lifts the armature and valve assembly 50—54—46a and establishes communication between the cylinder 42a and the pressure conduit 47a, thus moving the gate valve 33a to its closed position and preventing any further flow of glass through the passageway 32. The further rotation of the commutator 63 then breaks the connection between the shaft segment 82a and the brush 62, interrupts the flow of current through the coil 103, and permits the valve 12a to be reopened by the weight 101a, thus admitting compressed fluid (at super-atmospheric pressure) to the upper end of the chamber D and accelerating the flow of glass from the delivery orifice F. This accelerated gravity-pressure discharge continues until the body of the glass in the chamber D is depressed to a predetermined level—corresponding to the adjusted position of the lower end of the contact rod 77a—whereupon the interruption of the electrical circuit through the glass itself (between the contacts 77a and 78) breaks the circuit through the outer coil 104 of the compound electromagnet 104—105. This subjects the armature 102 to the unbalanced pull of the inner coil 105 (through which current still continues to flow), and the said armature is then raised to again close the valve 12a and shut off further flow of compressed fluid to the bell pipe connection 7a;—thereby decelerating the discharge from the delivery orifice and initiating a natural "necking" of the outflowing stream under the action of gravity alone. Immediately after this occurs the commutator circuit 66—65a is again interrupted—by the gap between the ends of the conducting segment 81a—and the electromaget coils are deenergized to permit the dropping of the valve 46a, and the reestablishment of a connection between the cylinder 42a and the vacuum conduit 48a. This in turn opens the gate valve 33a and the passageway 32 to the segregation chamber D. The electrical circuit through the commutator elements 109—111, is then momentarily broken (by the gap between the ends of the segment 112—and the inner coil 105 is deenergized to permit of the dropping of the weighted armature 102 and the reopening of the valve 12a. This puts the pipe 7a into communication with the vacuum line 48a and immediately accelerates the flow of glass through the wide open passageway 32 into the segregation chamber. The resultant rise of the level of the molten material in the bell closes the electrical circuit through the outer coil 104, but the lifting effect of the latter on the armature 102 is now counteracted by the concurrent closure of the commutator circuit 109—111 and the resultant energization of the inner coil 105; so that there is not under these circumstances any further movement of the valve 12a until the glass has again reached the upper level of its movement and has closed the circuit through the contact points 20a—21a and energized the coil 103; after which the above cycle of operations is repeated at a speed dependent upon the rate of rotation of the commutator assembly 63—67 and 110. But it is also apparent that the brush 109 may be readily adjusted so as to keep the commutator circuit 109—112—111 open for a short time after the closing of the circuit through the contact points 77a—78a; and in that case the valve 12a may be momentarily closed during the first stage of the bell recharging operation, and the effect of applying a very high initial vacuum (suction)—such as it is possible to use in my improved procedure—may be thus prevented from producing a too rapid insurge of unusually fluid (high temperature) glass through the supply passage 32. This same result may also be obtained by controlling the degree of opening of the gate valve 33a, (or of the plunger valve 33); and for the purpose of regulating this I provide an adjustable stop 115a (or 115), which limits the outward (or upward) movement of the member 33a (or 33); and I likewise provide an adjustable opposing stop 116a (or 116) to limit the closing movement of this valve and preventing it from actually coming in contact with the face of the floor block 2a (or 2).

Other undescribed, and incompletely illustrated details such as a supplemental means for heating the forehearth chamber (e. g. see Fig. III, the means for raising or lowering the forehearth gate (1), the means for supporting the various parts of the superstructure of my Fig. V construction on the forehearth boot; the shear mechanism for severing the outflowing stream of glass at a desired time in the cycle of feed action etc.—will be readily understood, and supplied by those skilled in this art, without further explanation. None of these supplemental or associated features of construction form any essential part of my present improvements, except insofar as they contribute to the provision of a self contained, and self controlled means of regulating the flow of glass into and out of the delivery chamber of a "forced flow" feeder, and of definitely limiting this flow under the alternate application of decelerating and accelerating forces, independently of temperature and viscosity changes in the molten material, and independently of variations either in the magnitude of these forces, or in the movements of any mechanical "timer mechanism" that may be used to govern their application. It will also be apparent that I contemplate employing means, such as shears, below the orifice F for severing the issuing flow into mold charges.

With the preceding disclosure as a guide, other engineers, and users of this class of glass feeders, will be able to readily devise many alternative forms of apparatus which will embody, in whole or in part, the characteristic features of the invention disclosed in the foregoing description; and I do not, therefore, desire to limit myself to any specific details of construction hereinbefore presented. I desire it to be understood that I have devised various structures and various feeding procedures for feeding a continuously flowing stream of molten glass to produce well formed mold charges and in which a continuous gravity flow of glass is maintained through the orifice and in which the glass at the orifice is never retracted or retarded and that such mechanisms and procedures form the subject matter of and are claimed in copending applications and structurally and functionally distinguish from the features herein claimed.

What I claim is:

1. A feeder for thermoplastic material comprising a receptacle, a segregation chamber extending into said receptacle and having a submerged flow orifice, a mechanism for controlling flow of material from said receptacle to said chamber, a tube extending into said segregation chamber, means connected to said tube for subjecting the interior of said chamber to variations in fluid pressure, a valve in said tube, means associated with said chamber and rendered operative by the movement of material therein for closing said valve, and means for periodically opening said valve.

2. A feeder for thermoplastic material, comprising a receptacle, a segregation chamber extending into said receptacle and having a flow orifice formed therein, a mechanism for controlling the delivery of material from said receptacle to said chamber, means for subjecting the interior of said chamber to variations in fluid pressure, means rendered operative by variations in material level within said chamber for limiting the extent and duration of said fluid pressure variations, and means operating in synchronism with said delivery control mechanism for re-subjecting the interior of the chamber to the fluid pressure variations.

3. A feeder for thermoplastic material, comprising a receptacle, a segregation chamber extending into said receptacle and having a flow orifice formed therein, a mechanism for controlling the delivery of material from said receptacle to said chamber, means for alternately subjecting the interior of said chamber to super- and sub-atmospheric pressures, means responsive to variations in the level of material within said chamber for limiting the duration of said pressures, and means for periodically reestablishing communication between the chamber and said pressures.

4. A feeder for thermoplastic material, comprising a receptacle, a segregation chamber extending into said receptacle and having a flow orifice formed therein, a mechanism for controlling the delivery of material from said receptacle to said chamber, means for periodically closing and opening said delivery control mechanism, means for subjecting the interior of said chamber to fluid pressure to discharge material therefrom through said orifice and means responsive to variations of material level within said chamber for limiting the application of such fluid pressure, and means operating in synchronism with the opening of said delivery control mechanism for resetting said pressure limiting means.

5. A feeder for molten glass, comprising a receptacle, a segregation chamber having an inlet port communicating with said receptacle and a glass delivery port, a gate for controlling said inlet port, means for periodically opening and closing said gate, a tube having communication with the space above the glass in said chamber and having a portion submerged in the glass therein, means including said tube and submerged portion for controlling the subjection of the glass in said chamber alternately to decelerating and accelerating forces, means responsive to the level of glass within said chamber for closing said valve, and means operating in synchronism with the opening and the closing of said gate for periodically opening said valve.

6. In combination in a glass feeder, a receptacle for molten glass, in open communication with a glass furnace, a segregation chamber having a glass submerged inlet port communicating with said receptacle, and a submerged delivery port, means for controlling said inlet port, a tube extending into said segregation chamber, means for alternately delivering sub- and super-atmospheric pressures to said chamber through said tube, a valve disposed in said tube, means responsive to variations of glass level within said chamber for closing said valve to limit the degree and duration of said pressures, and means for periodically opening said valve.

7. The combination in a glass feeder, a receptacle for molten glass, a segregation chamber having a glass submerged inlet port and a glass submerged delivery port, a tube extending into said segregation chamber, means for controlling said inlet port, means operating in synchronism therewith for alternately connecting said tube with sub and superatmospheric pressures to subject glass within said chamber to decelerating and accelerating forces, means responsive to variations of glass level within said chamber for closing said tube to limit the duration and the degree of such forces, and means operating in synchronism with said inlet controlling means for periodically opening said tube.

8. In a glass feeder, a receptacle for molten glass, a segregation chamber communicating with said receptacle below the level of the glass contained therein, a tube leading into said chamber, means for alternately connecting said tube to super- and sub-atmospheric pressures, closing means for said tube, electrical contact means projecting into said chamber for operating said tube closing means, and means operating in synchronism with the pressure connecting means for periodically releasing said tube closing means.

9. In a glass feeder, a receptacle for molten glass, a segregation chamber communicating with said receptacle below the glass level therein, means for subjecting the interior of said chamber to vacuum pressure, means for limiting the duration and effect of said vacuum pressure, electrical contact means projecting into said chamber for operating said last mentioned means, and electrical contact means for periodically resetting said limiting means.

10. A feeder for thermoplastic material comprising a receptacle, a segregation chamber communicating with said receptacle and having a flow delivery orifice therein, a mechanism for controlling the flow from the receptacle into said segregation chamber, means for periodically opening and closing said mechanism, a tube leading from said segregation chamber, a valve in said tube, means for alternately connecting said tube to sources of sub- and super-atmospheric pressures to draw glass into said chamber and to expel it therefrom, an electromagnet controlling the operation of said valve, means responsive to changes in material level within said chamber for energizing said magnet to close said valve, and means for periodically deenergizing said magnet to permit said valve to open.

11. A feeder for thermoplastic material comprising a receptacle, a segregation chamber extending into said receptacle and having a flow orifice formed therein, a mechanism for controlling the delivery of material from said receptacle to said chamber, means for alternately subjecting the interior of said chamber to super- and sub-atmospheric pressures, means for limiting the extent and duration of said pressures, electrical contact means energized by the variations in the level of glass within said chamber for actuating said last-mentioned means and electrical contact means for periodically resetting said limiting means.

12. A glass feeder comprising a receptacle for molten glass having a submerged discharge outlet therein, a segregation chamber communicating with said outlet and with said receptacle, a movable gate for controlling communication between said receptacle and said chamber, a piston connected to move with said gate, a cylinder in which said piston reciprocates, means for alternately connecting said cylinder to sources of super- and sub-atmospheric pressures to move said gate into and out of communication-closing position, means for pneumatically connecting said cylinder to said chamber, a valve controlling the pneumatic connection between said cylinder and said chamber, means responsive to the variations in the level of glass in said chamber for moving said valve to its closed position, and means for periodically moving said valve to its open position to reestablish communication between said cylinder and said chamber.

13. A glass feeder comprising a receptacle for molten glass having a submerged discharge outlet therein, a segregation chamber communicating with said outlet and with said receptacle, a movable gate for controlling communication between said receptacle and said chamber, fluid actuated means for operating said gate, means for connecting said fluid actuating means to said chamber to control the flow of glass into and out of said chamber, and means responsive to the variations in the level of glass within said chamber for closing communication between said chamber and said fluid actuated means.

14. A glass feeder comprising a receptacle for molten glass having a submerged discharge outlet therein, a segregation chamber communicating with said outlet and with said receptacle, a movable gate for controlling communication between said receptacle and said chamber, fluid actuated means for operating said gate, means for connecting said fluid actuating means to said chamber to control the flow of glass into and out of said chamber, means responsive to the variations in the level of glass within said chamber for closing communication between said chamber and said fluid actuated means, and means for periodically establishing communication between said chamber and said fluid actuated means.

15. A glass feeder comprising a receptacle for molten glass having a submerged discharge outlet, a segregation chamber communicating with said outlet and with said receptacle, a movable gate for controlling the delivery of glass from said receptacle to said chamber, fluid actuated means for periodically operating said gate to alternately establish and close communication between said receptacle and said chamber, means for pneumatically connecting said fluid actuated means to said chamber, a valve controlling said last-mentioned means, means responsive to the variations in the level of glass in said chamber to move said valve to close communication between said fluid actuated means and said chamber, and means for periodically moving said valve to re-establish the connection between said chamber and said fluid actuated means.

FRANK L. O. WADSWORTH.